(12) United States Patent
Franklin et al.

(10) Patent No.: US 8,690,412 B2
(45) Date of Patent: Apr. 8, 2014

(54) BACKLIGHT STRUCTURES AND BACKLIGHT ASSEMBLIES FOR ELECTRONIC DEVICE DISPLAYS

(75) Inventors: Jeremy C. Franklin, San Francisco, CA (US); Derek Wright, San Francisco, CA (US); Wenyong Zhu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 13/421,703

(22) Filed: Mar. 15, 2012

(65) Prior Publication Data

US 2013/0242600 A1 Sep. 19, 2013

(51) Int. Cl.
*F21V 33/00* (2006.01)
(52) U.S. Cl.
USPC .......................................... 362/613; 362/612
(58) Field of Classification Search
USPC .................................. 362/611, 612, 613, 555
See application file for complete search history.

(56) References Cited

U.S. PATENT DOCUMENTS

| | | | |
|---|---|---|---|
| 6,358,064 B2 | 3/2002 | Szalay et al. | |
| 6,358,065 B1 | 3/2002 | Terao et al. | |
| 7,364,345 B2 | 4/2008 | Fang | |
| 7,796,211 B2 * | 9/2010 | Yu | 349/65 |
| 2001/0019479 A1 | 9/2001 | Nakabayashi | |
| 2006/0239034 A1 * | 10/2006 | Keh et al. | 362/613 |
| 2006/0262554 A1 * | 11/2006 | Mok et al. | 362/555 |
| 2009/0040786 A1 | 2/2009 | Mori | |
| 2009/0237957 A1 * | 9/2009 | Tsubaki | 362/615 |
| 2010/0060601 A1 * | 3/2010 | Oohira | 345/173 |
| 2010/0118563 A1 | 5/2010 | Shen et al. | |
| 2010/0309410 A1 * | 12/2010 | Yang et al. | 349/64 |
| 2011/0187965 A1 | 8/2011 | Ooishi | |
| 2012/0033447 A1 * | 2/2012 | Hashino | 362/612 |
| 2012/0062816 A1 * | 3/2012 | Tsubaki | 349/61 |

FOREIGN PATENT DOCUMENTS

| | | |
|---|---|---|
| EP | 2336812 | 6/2011 |
| WO | 02/097324 | 12/2002 |

* cited by examiner

*Primary Examiner* — Laura Tso
(74) *Attorney, Agent, or Firm* — Treyz Law Group; Kendall P. Woodruff

(57) ABSTRACT

An electronic device may have a liquid crystal display with backlight structures. The backlight structures may produce backlight that passes through the display layers in the display. The display layers may include a layer of liquid crystal material interposed between a color filter layer and a thin-film transistor layer. The backlight structures may include a light guide plate. A plurality of light-emitting diodes mounted on a flexible printed circuit may be coupled to an edge of the light guide plate. The flexible printed circuit may be curled into a spring element to bias the light-emitting diodes against the edge of the light guide plate. A plurality of gaps may be formed in the flexible printed circuit and may be used to separate and mechanically decouple adjacent light-emitting diodes. Individual light-emitting diodes may independently register to the light guide plate to maximize optical efficiency in the display.

21 Claims, 11 Drawing Sheets

BACKLIGHT STRUCTURES AND BACKLIGHT ASSEMBLIES FOR ELECTRONIC DEVICE DISPLAYS

BACKGROUND

This relates generally to electronic devices and, more particularly, to electronic devices with displays and associated backlight structures.

Electronic devices such as computers and cellular telephones have displays. Some displays such as plasma displays and organic light-emitting diode displays have arrays of display pixels that generate light. In displays of this type, backlighting is not necessary because the display pixels themselves produce light. Other displays contain passive display pixels that can alter the amount of light that is transmitted through the display to display information for a user but do not produce light themselves. As a result, it is often desirable to provide backlight for a display with passive display pixels.

In a typical backlight assembly for a display, a light guide plate is used to distribute backlight generated by a light source such as a light-emitting diode light source. Optical films such as a diffuser layer and brightness enhancing film may be placed on top of the light guide plate. A reflector may be formed under the light guide plate to improve backlight efficiency.

To provide satisfactory backlighting, it may be desirable to locate one or more strips of light-emitting diodes on the edges of a light guide plate. A light strip of light-emitting diodes may be formed by mounting a row of light-emitting diodes onto a flex circuit. Light strips are typically attached at the edges of the light guide plate so that the light-emitting diodes can direct light into the light guide plate.

In an ideal light strip, the light-emitting diodes are aligned with each other so that each light-emitting diode can physically contact the light guide plate. However, there are often placement variations within a row of light-emitting diodes that result in misalignment. If care is not taken, this type of misalignment can result in air gaps between the light-emitting diodes and the light guide plate. The presence of air gaps can have an adverse impact on backlight efficiency. Poor backlight efficiency may in turn decrease power consumption efficiency and can reduce battery life in an electronic device.

It would therefore be desirable to be able to provide electronic devices with improved arrangements for backlighting displays.

SUMMARY

A backlight assembly may be provided for producing backlight illumination for a display. The backlight assembly may have light sources such as light-emitting diodes. The light-emitting diodes may be edge-emitting diodes that emit light through edges that are perpendicular to a base surface or may emit light through a surface that opposes the base surface.

The backlight assembly may include a light guide plate. The light guide plate may have an upper surface through which backlight is provided to the underside of the display. The light guide plate may also have edge portions into which light may be launched from the light-emitting diodes.

The light-emitting diodes may be mounted on a flexible substrate such as a flexible printed circuit formed form a flexible sheet of polymer. The flexible printed circuit may be wrapped around a bend guiding structure to form a spring. The spring may press the light-emitting diodes against the edge portions of the light guide plate.

Slots or other decoupling features may be provided within the flexible printed circuit to mechanically decouple adjacent light-emitting diodes from each other. The slots may be rectangular in shape and may have locally widened portions. Slots may be formed along one edge of a flexible printed circuit or may be formed on opposing edges of the flexible printed circuit so that the flexible printed circuit has a serpentine shape.

Perforations may be formed within the bent portion of a spring-shaped curled flexible printed circuit. Locally widened traces may be formed on the bent portion of a flexible printed circuit to enhance trace strength.

A foam structure such as a thermally conductive foam that serves as a heat sink, a bent metal structure, or other biasing structure may be used to bias the flexible printed circuit and attached light-emitting diodes against the edge portions of the light guide plate. The flexible printed circuit may be attached to a support structure using an adhesive that allows the flexible printed circuit and the light-emitting diodes to laterally move relative to the edge portions of the light guide plate. This aligns the light-emitting diodes to the edge portions of the light guide plate and minimizes gaps between the light-emitting diodes and the light guide plate. Rail holes within a flexible printed circuit may be used to allow the flexible printed circuit and light-emitting diodes to be laterally aligned with the light guide plate.

The light guide plate may have holes into which the light-emitting diodes are placed. Index-of-refraction-matching material that matches the index-of-refraction of the light guide plate may be used to fill gaps between the light-emitting diodes and the light guide plate to improve coupling efficiency. Reservoirs may be coupled to the holes to accommodate excess index-of-refraction-material material.

Further features of the invention, its nature and various advantages will be more apparent from the accompanying drawings and the following detailed description of the preferred embodiments.

DETAILED DESCRIPTION

A display may be provided with backlight structures. The backlight structures may produce backlight for the display that helps a user of a device view images on the display in a variety of ambient lighting conditions. Displays with backlights may be provided in any suitable type of electronic equipment.

Figure 1:
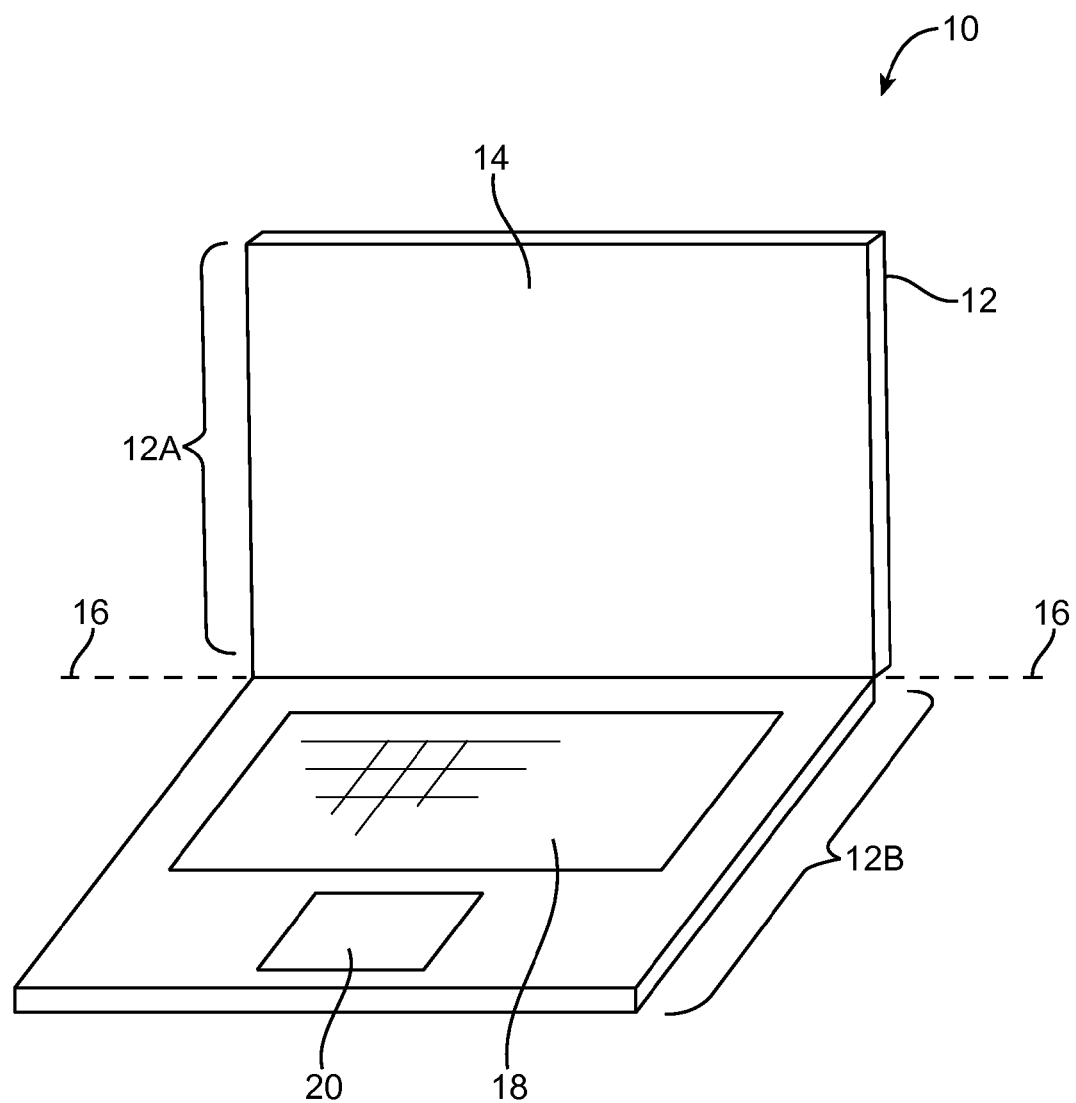
FIG. 1 is a diagram of an illustrative electronic device such as a portable computer having a backlit display in accordance with an embodiment of the present invention.

An illustrative electronic device of the type that may be provided with a backlit display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a backlit display such as display 14. Display 14 may be a touch screen that incorporates capacitive touch electrodes or other touch sensor components or may be a display that is not touch-sensitive. Display 14 may include image pixels formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Figure 2:
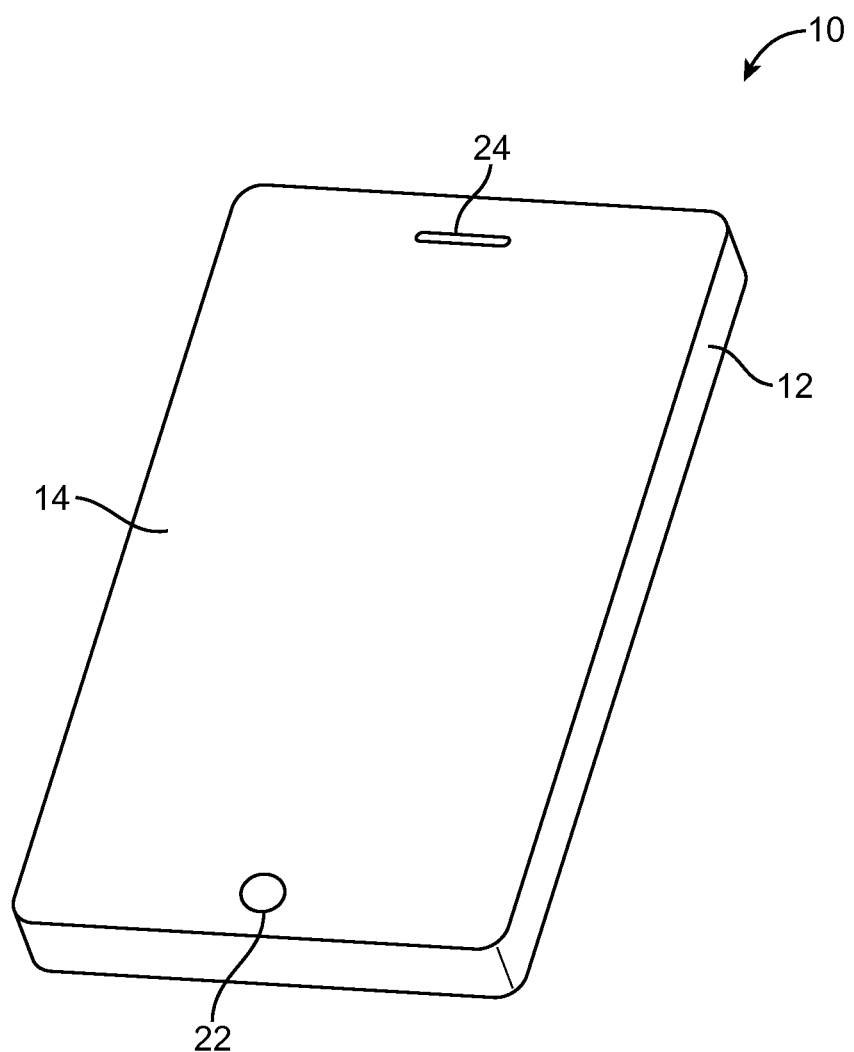
FIG. 2 is a diagram of an illustrative electronic device such as a cellular telephone or other handheld device having a backlit display in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a backlit display such as display 14 mounted on the front of housing 12. Display 14 may be substantially filled with active display pixels or may have an inactive portion and an inactive portion. Display 14 may have openings (e.g., openings in the inactive or active portions of display 14) such as an opening to accommodate button 22 and an opening to accommodate speaker port 24.

Figure 3:
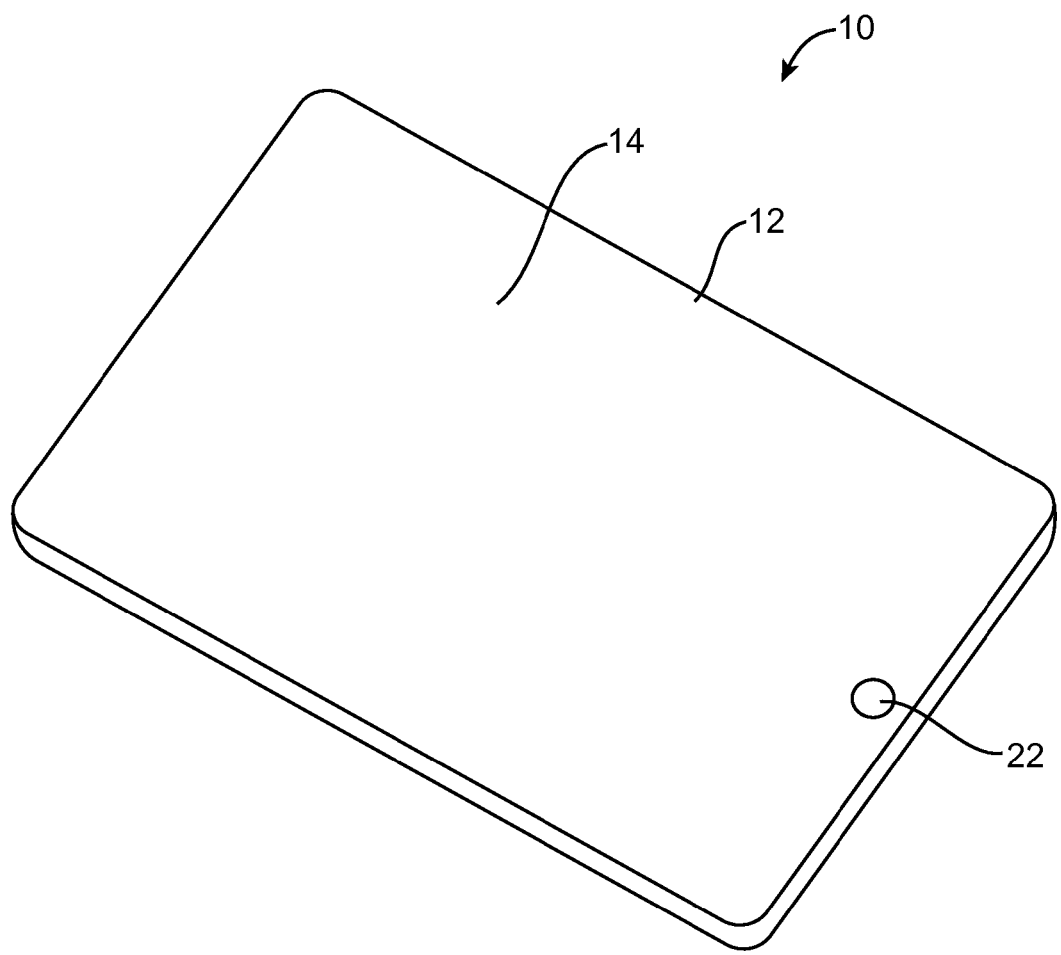
FIG. 3 is a diagram of an illustrative electronic device such as a tablet computer having a backlit display in accordance with an embodiment of the present invention.

FIG. 3 is a perspective view of electronic device 10 in a configuration in which electronic device 10 has been implemented in the form of a tablet computer. As shown in FIG. 3, backlit display 14 may be mounted on the upper (front) surface of housing 12. An opening may be formed in display 14 to accommodate button 22.

Figure 4:
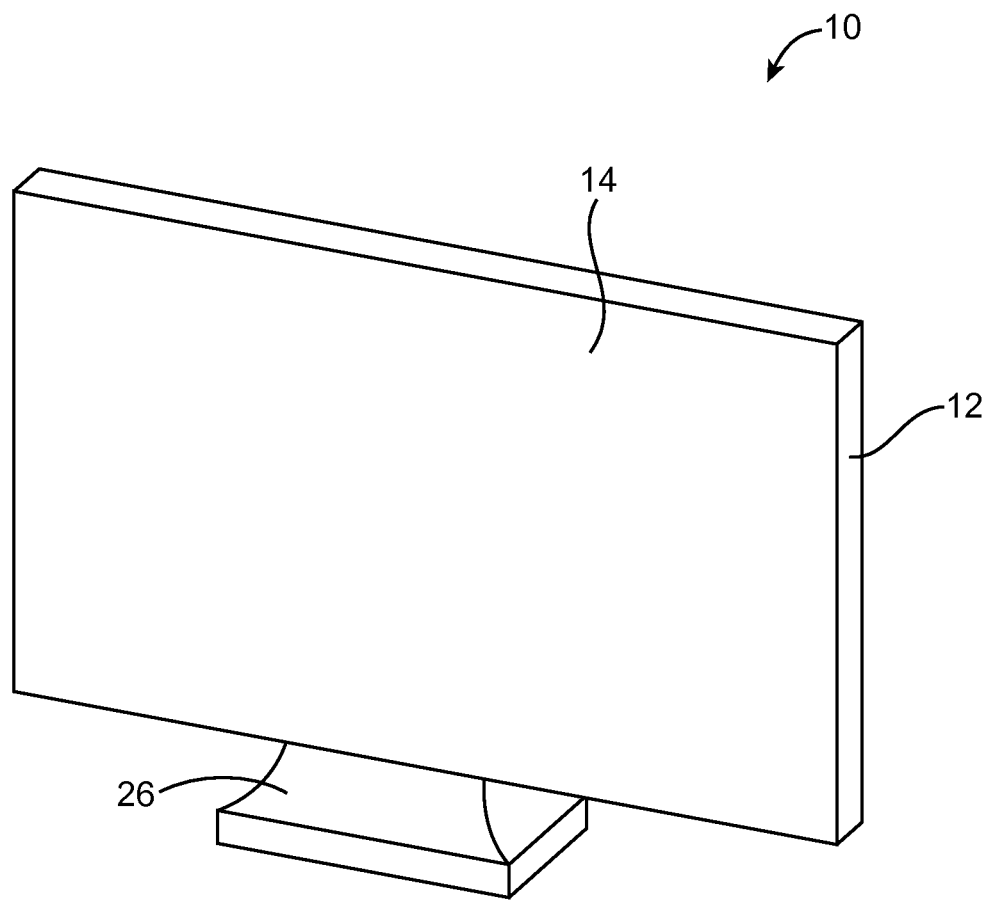
FIG. 4 is a diagram of an illustrative electronic device such as a computer monitor with a built-in computer having a backlit display in accordance with an embodiment of the present invention.

FIG. 4 is a perspective view of electronic device 10 in a configuration in which electronic device 10 has been implemented in the form of a computer integrated into a computer monitor. As shown in FIG. 4, backlit display 14 may be mounted on the front surface of housing 12. Stand 26 may be used to support housing 12.

Figure 5:
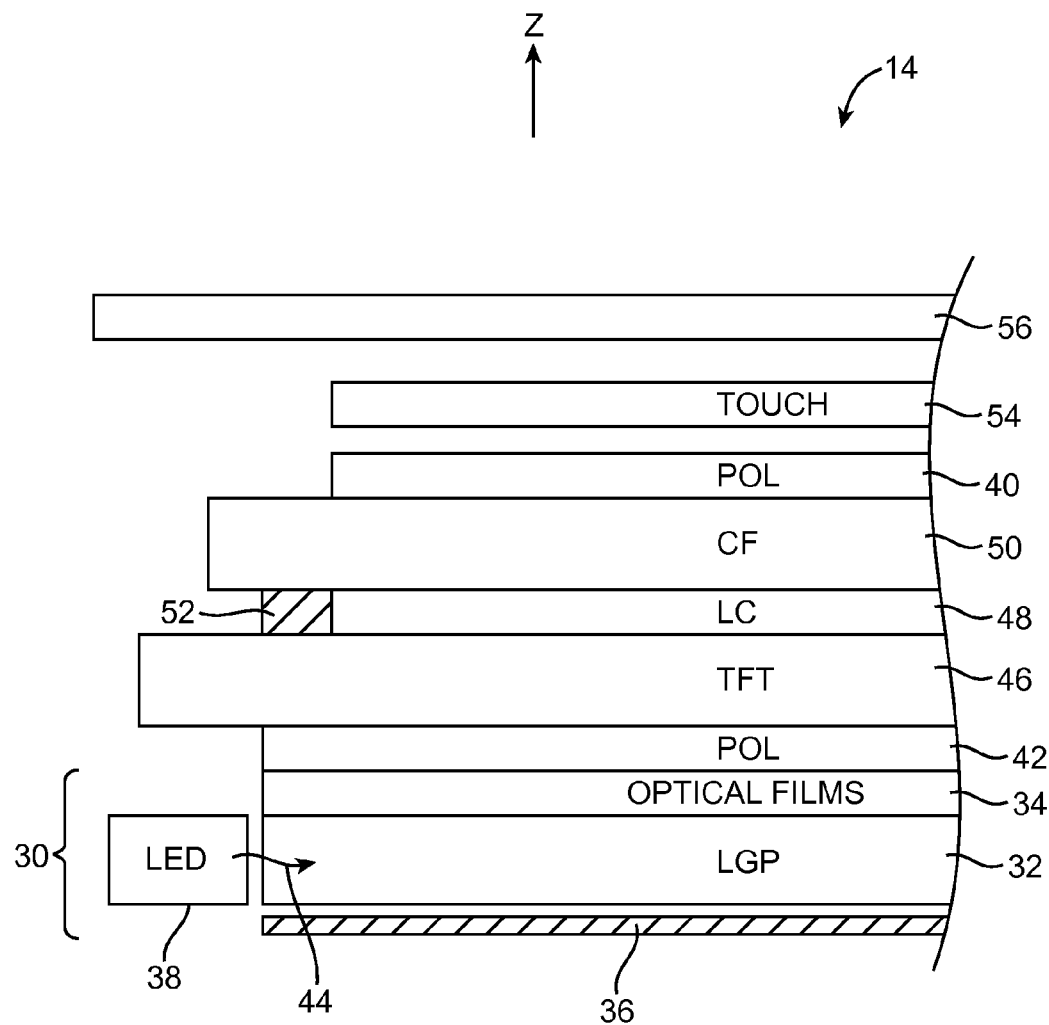
FIG. 5 is a cross-sectional side view of an illustrative backlit display in accordance with an embodiment of the present invention.

A cross-sectional side view of display 14 is shown in FIG. 5. As shown in FIG. 5, display 14 may include backlight structures 30. Backlight structures 30 may include a light source such as light-emitting diode light source 38, a light guide plate such as light guide plate 32, optical films 34, and a reflector such as reflector 36. During operation, light-emitting diode light source 38 may emit light 44 into light guide plate 32. Light guide plate 32 may be formed from a rectangular sheet of clear plastic. Light 44 may travel within light guide plate 32 by means of total internal reflection. Light that escapes through the upper surface of light guide plate 32 may pass through overlying display layers in direction z and may serve as backlight for display 14. Light that escapes through the lower surface of light guide plate 32 may be reflected by reflector 36 and redirected upwards in direction z. Reflector 36 may be formed from a reflective material such as white plastic (as an example). Optical films 34 may include brightness enhancing film layers, diffusing film layers, and compensating film layers (as examples).

Display 14 may have an upper polarizer layer such as polarizer layer 40 and a lower polarizer layer such as polarizer layer 42. Polarizer layer 42 may polarize backlight 44. Thin-film transistor (TFT) layer 46 may include a layer of thin-film transistor circuitry and an array of associated pixel electrodes. Pixel structures such as thin-film transistor structures and associated pixel electrodes in the array of pixel electrodes on thin-film transistor layer 46 may produce electric fields corresponding to image data to be displayed. The electric field produced by each electrode on thin-film transistor layer 46 adjusts the orientation of liquid crystals in an associated portion of liquid crystal layer 48 by a corresponding amount. As light travels through display 14, the adjustment of the orientation of the liquid crystals adjusts the polarization of the light that passes through layer 48. When this light reaches upper polarizer 40, the polarization state of each pixel of light is attenuated by an amount that is proportional to its polarization, thereby creating visible images for a user.

Color filter layer 50 may contain an array of colored pixels (e.g., an array of red, blue, and green color filter elements) for providing display 14 with the ability to form color images. Sealant 52 may be used to seal color filter layer 50 to thin-film transistor layer 46 and to retain liquid crystal material 48 within display 14.

Display 14 may include a touch-sensitive layer such as touch-sensitive layer 54 for receiving touch input from a user of device 10. Touch-sensitive layer 54 may include a pattern of indium tin oxide (ITO) electrodes or other suitable transparent electrodes that have been deposited to form a capacitive touch sensor array. Touch-sensitive layer 54 may, in general, be configured to detect the location of one or more touches or near touches on touch-sensitive layer 54 based on capacitive, resistive, optical, acoustic, inductive, or mechanical measurements, or any phenomena that can be measured with respect to the occurrence of the one or more touches or near touches in proximity to touch-sensitive layer 54. If desired, touch-sensitive layer 54 may be incorporated into thin-film transistor layer 46 (e.g., display pixel electrodes and capacitive touch electrodes may be formed on a common substrate). The example of FIG. 5 in which touch-sensitive layer 54 is separate from thin-film transistor layer 46 is merely illustrative.

If desired, additional layers may be included in display 14. An optional layer of transparent glass or plastic may be used to provide a protective cover for display 14, as illustrated by cover layer 56 of FIG. 5.

Figure 6:
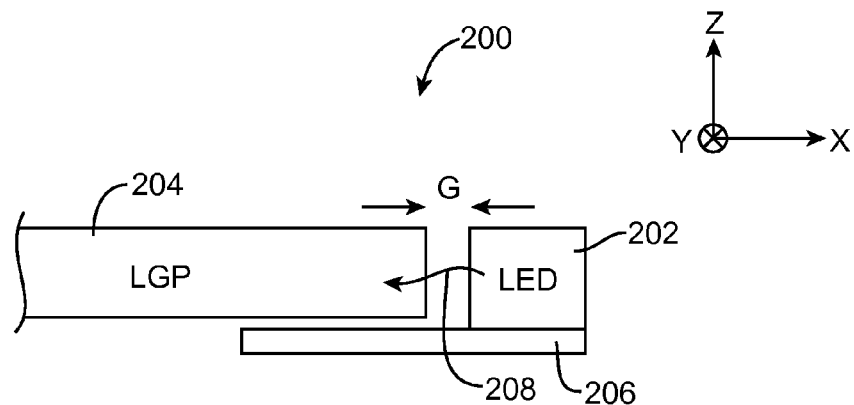
FIG. 6 is a cross-sectional side view of a conventional backlight arrangement having air gaps between the light-emitting diodes and the light guide plate.

A cross-sectional side view of a conventional backlight arrangement is shown in FIG. 6. As shown in FIG. 6, backlight illumination is provided by a strip of light-emitting diodes 202 located along the edge of light guide plate 204. Light-emitting diodes 202 are mounted to flexible printed circuit substrate 206, typically using solder. Due to placement variation during the mounting process, light-emitting diodes 202 are often misaligned. As a result, an air gap G forms between light-emitting diodes 202 and the edge of light guide plate 204. Such air gaps G can have an adverse impact on backlight efficiency. For example, light 208 will experience a change in refractive index as it travels from air gap G to light guide plate 204. This in turn will alter the angle at which light 208 enters light guide plate 204, possibly inhibiting the ability of light guide plate 204 to evenly distribute backlight to the entire display.

Figure 7:
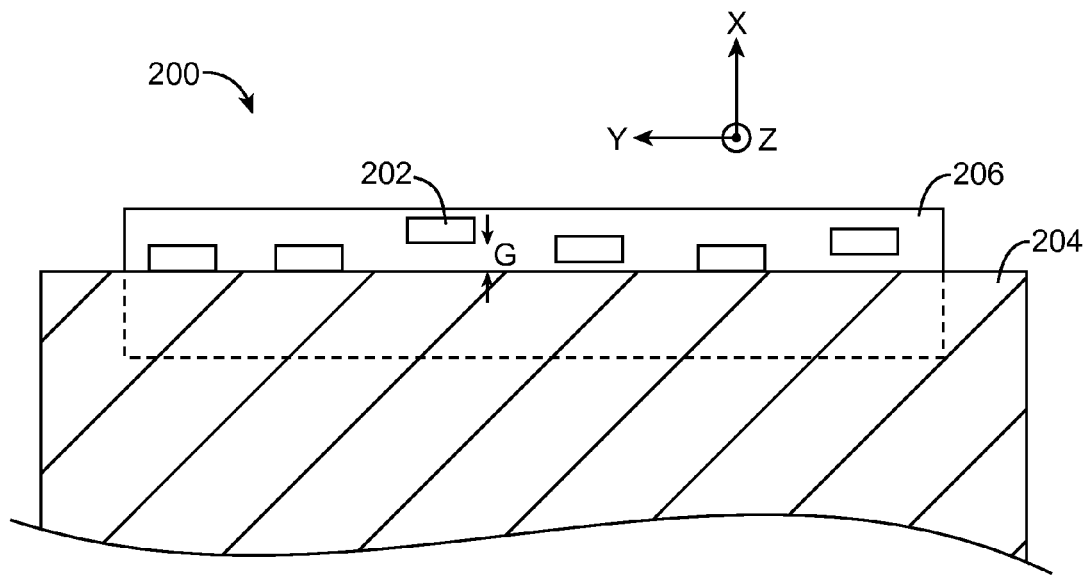
FIG. 7 is a top view of a conventional backlight arrangement having air gaps between the light-emitting diodes and the light guide plate.

A top view of a conventional backlight arrangement with air gaps is shown in FIG. 7. As shown in FIG. 7, light-emitting diodes 202 are misaligned, resulting in air gaps G between light-emitting diodes 202 and light guide plate 204. Because light-emitting diodes 202 are mechanically coupled together by the solid strip of flexible printed circuit substrate 206, individual light-emitting diodes 202 are not able to independently register to light guide plate 204. As a result, backlight structures 200 will have low optical efficiency.

Figure 8A:
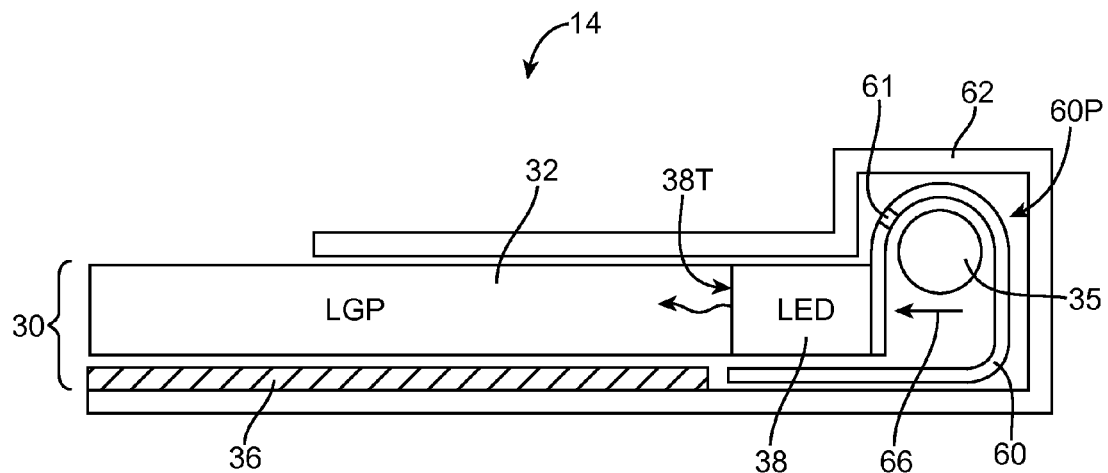
FIG. 8A is a cross-sectional side view of a backlight arrangement in which light-emitting diodes are mounted on a flexible substrate that is curled into a spring element that biases the top of each light-emitting diode against a light guide plate in accordance with an embodiment of the present invention.

FIG. 8A is a cross-sectional side view of a portion of display 14 illustrating how the optical efficiency of display 14 may be maximized. As shown in FIG. 8A, backlight structures 30 may include light guide plate 32, reflector 36, and a plurality of light-emitting diodes 38. Light-emitting diodes 38 may be mounted on a strip of flexible printed circuit (sometimes referred to as a "flex circuit" or "flex tail") such as flex circuit 60. Flex circuit 60 and other flexible printed circuits in device 10 may be formed from sheets of polyimide and/or other layers of polymer. Flex circuit 60 may include patterned metal traces to which packaged light-emitting diodes 38 are soldered. Patterned metal traces on flex circuit 60 may be used to distribute power to conductive terminals of light-emitting diodes 38. The strip of flex circuit 60 on which the plurality of light-emitting diodes 38 is mounted is sometimes referred to as a "light strip" or a "light bar."

Backlight structures 30 may be mounted within an optional support structure such as support structure 62. Support structure 62 (sometimes referred to as a chassis or mechanical chassis) may be formed from materials such as plastic, ceramic, fiber composites, metal, or other suitable materials. If desired, display 14 may be formed by mounting backlight structures 30 directly within housing 12 or by mounting backlight structures 30 in support structures of other shapes. In the illustrative configuration of FIG. 8A, mechanical chassis 62 is used in forming a backlight assembly for display 14 that may be mounted within housing 12 under a display cover layer such as display cover layer 56 of FIG. 5. Other mounting configurations may be used, if desired.

As shown in FIG. 8A, light-emitting diodes 38 may be interposed between flex tail 60 and light guide plate 32. Each light-emitting diode 38 may have a base surface that is mounted (e.g., soldered) to flex tail 60 and a top surface 38T opposing the base surface that emits light into light guide plate 32. To ensure that light-emitting diodes 38 press against light guide plate 32, flex tail 60 may be curled and/or bent to form a spring element such as spring element 60P. Spring element 60P may exert a force on light-emitting diodes 38 in direction 66 (e.g., towards light guide plate 32). To form flex tail 60 into this type of spring element, flex tail 60 may be curled inside of support structure 62. In an attempt to return to its equilibrium position (e.g., uncurled), flex tail 60 will naturally exert a force in direction 66, thereby pressing top surface 38T of light-emitting diodes 38 against light guide plate 32. Light may be emitted from top surface 38T of light-emitting diode 38 directly into the edge of light guide plate 32. Forming flex tail 60 into a spring element that biases light-emitting diodes 38 against light guide plate 32 may help reduce or eliminate air gaps between light-emitting diodes 38 and light guide plate 32.

If desired, a bend-guiding structure such as bend-guiding structure 35 may optionally be used to form and shape flex tail 60 into spring element 60P. Flex tail 60 may be bent around bend-guiding structure 35 to form the desired bend in flex tail 60. Bend-guiding structure 35 (sometimes referred to as a mandrel) may be a compliant or undersized structure and may be formed from materials such as foam, rubber, plastic, or other suitable materials. For example, bend-guiding structure 35 may have an elongated rod shape that runs parallel to an edge of electronic device 10. A curved surface on bend-guiding structure 35 may be used in forming a bent portion on flex tail 60 as flex tail 60 curls around bend-guiding structure 35. If desired, bend-guiding structure 35 may be heated while manipulating flex tail 60 into spring element 60P. Bend-guiding structure 35 may be formed as an integral part of housing 12, may be formed as an integral part of support structure 62, or may be a separate structure used to form flex tail 60 into spring element 60P.

Some areas such as bend region 61 of spring element 60P may have a smaller bend radius than other areas of spring element 60P. Measures may be taken to minimize the stress on flex tail 60 in regions such as region 61. For example, region 61 of flex tail 60 may be provided with perforations, may be preformed (e.g., using a heated forming process or a cold forming process), may have reduced layers (e.g., copper plating in the bend region of flex circuit 60 may be reduced to one layer to increase flexibility in the bend region), etc. Patterned traces may be strengthened in portions of flex tail 60 that have a small bend radius by increasing the width of the traces in the bend region.

Figure 8B:
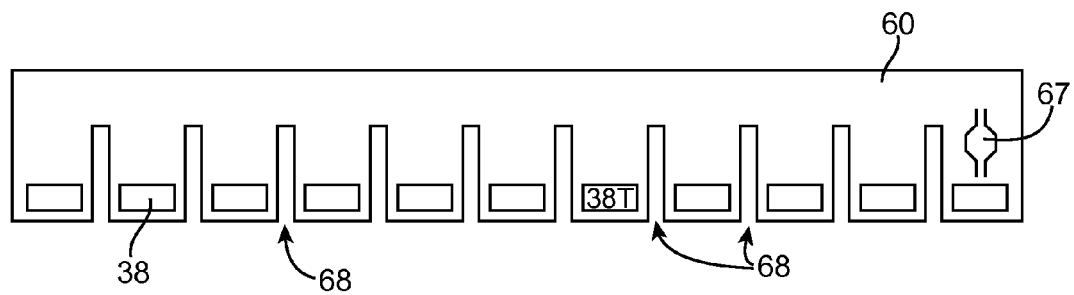
FIG. 8B is a top view of a flexible substrate that may be used to form the spring element of FIG. 8A in which the flexible substrate is provided with gaps that separate and mechanically decouple adjacent light-emitting diodes in accordance with an embodiment of the present invention.

Light-emitting diodes 38 may be mechanically decoupled from one another so that each individual light-emitting diode 38 may independently register to light guide plate 32. To decouple light-emitting diodes 38, gaps may be formed in flex tail 60 to separate adjacent light-emitting diodes 38. A top view of flex tail 60 in which gaps are used to separate adjacent light-emitting diodes 38 is shown in FIG. 8B. If desired, flex tail 60 of FIG. 8B may be used to form the spring element of FIG. 8A.

As shown in FIG. 8B, a plurality of gaps such as gaps 68 may be formed in flex tail 60, thereby creating a plurality of separated flexible "tabs." Each light-emitting diode 38 may be mounted on an associated flexible tab. Gaps (sometimes referred to as slots) may separate and mechanically decouple light-emitting diodes 38 from one another, allowing each to independently register to light guide plate 32. If desired, traces such as trace 67 may be locally widened in the bent portions of flex tail 60 to enhance the strength of the traces in the bent portions.

In FIG. 8B, flex tail 60 is shown in a flat position (e.g., "uncurled"). When flex tail 60 is curled into the shape of spring element 60P shown in FIG. 8A, top surface 38T of each light-emitting diode 38 will be pressed against the edge of light guide plate 32. The force provided by spring element 60P may push top surfaces 38T of light-emitting diodes 38 up against light guide plate 32, and each individual light-emitting diode 38 may independently register to light guide plate 32.

In the example of FIG. 8B, gaps 68 are used to isolate each individual light-emitting diode 38 (e.g., a single light-emitting diode 38 is mounted on each flexible tab). This is, however, merely illustrative. If desired, gaps 68 may be used to isolate groups of light-emitting diodes 38. For example, there may be two, three, or more than three light-emitting diodes on an associated flexible tab, if desired. In general, any number of gaps 68 may be used to separate any number of light-emitting diodes 38.

Figure 8C:
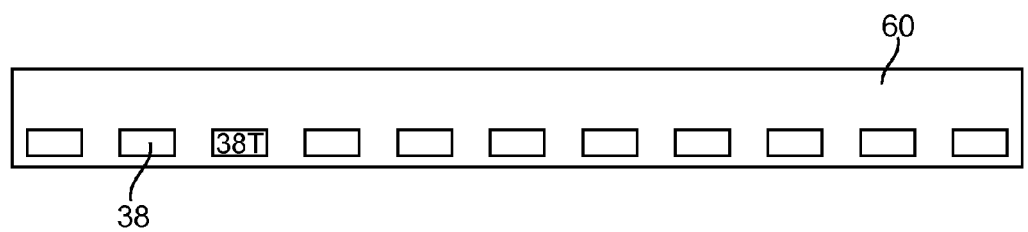
FIG. 8C is a top view of a flexible substrate that may be used to form the spring element of FIG. 8A in which the flexible substrate is free of gaps in accordance with an embodiment of the present invention.

FIG. 8C is a top view of another possible configuration of flex tail 60 that may be used to form spring element 60P of FIG. 8A. As shown in FIG. 8C, flex tail 60 on which light-emitting diodes 38 are mounted may be a solid strip of flexible printed circuit substrate. In FIG. 8C, flex tail 60 is shown in a flat position (e.g., "uncurled"). When flex tail 60 is curled into the shape of spring element 60P shown in FIG. 8A, the force provided by spring element 60P will push top surface 38T of each light-emitting diode 38 up against light guide plate 32. Light may be emitted from top surface 38T of light-emitting diodes 38 directly into the edge of light guide plate 32.

Since top surface 38T of each light-emitting diode 38 registers to light guide plate 32, any placement variation in light-emitting diodes 38 on flex tail 60 (e.g., variation in location on the surface of flex tail 60) will not affect the light-emitting diodes' ability to physically contact light guide plate 32. The force provided by spring element 60P will push top surface 38T in direct contact with light guide plate 32 regardless of any lateral misalignment on the surface of flex tail 60.

Figure 9A:
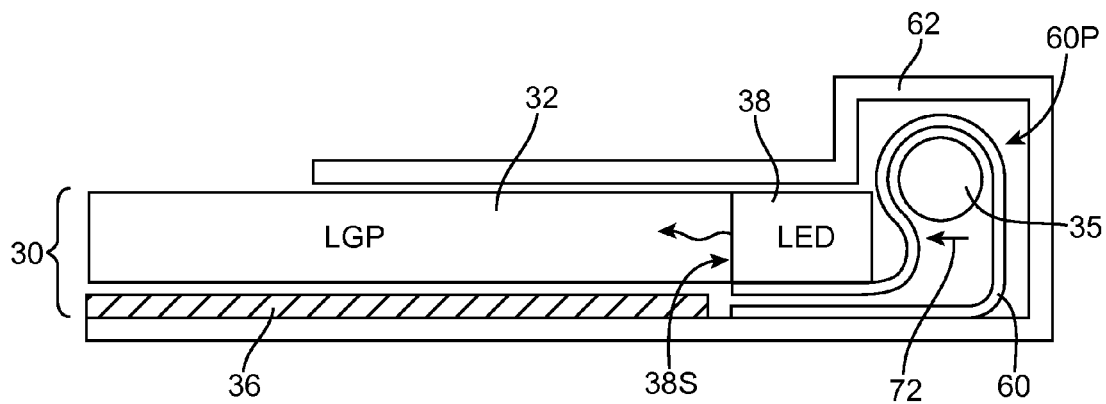
FIG. 9A is a cross-sectional side view of a backlight arrangement in which light-emitting diodes are mounted on a flexible substrate that is curled into a spring element that biases the side of each light-emitting diode against a light guide plate in accordance with an embodiment of the present invention.

FIG. 9A is a cross-sectional side view of a portion of display 14 illustrating another possible backlight assembly that may be used to optimize the optical efficiency of display 14. As shown in FIG. 9A, flex tail 60 may be curled and/or bent to form spring element 60P. Spring element 60P of FIG. 9A may exert a force on light-emitting diodes 38 in direction 72 (e.g., towards light guide plate 32), thereby pressing side surface 38S of light-emitting diodes 38 against light guide plate 32. Light may be emitted from side surface 38S of each light-emitting diode 38 (e.g., a surface that is perpendicular to the base surface of light-emitting diode 38) directly into the edge of light guide plate 32.

If desired, bend-guiding structure 35 may optionally be used to form and shape flex tail 60 into spring element 60P. Flex tail 60 may be wrapped around bend-guiding structure 35 to form the desired bend in flex tail 60. To minimize the stress on flex tail 60 in areas of small bend radius, portions of flex tail 60 may be perforated, may be preformed (e.g., using a heated forming process or a cold forming process), may have reduced layers (e.g., copper plating in bend regions of flex circuit 60 may be reduced to one layer to increase flexibility in the bend region), etc. Patterned traces may be strengthened in portions of flex tail 60 that have a small bend radius by increasing the width of the traces in the bend region.

Figure 9B:
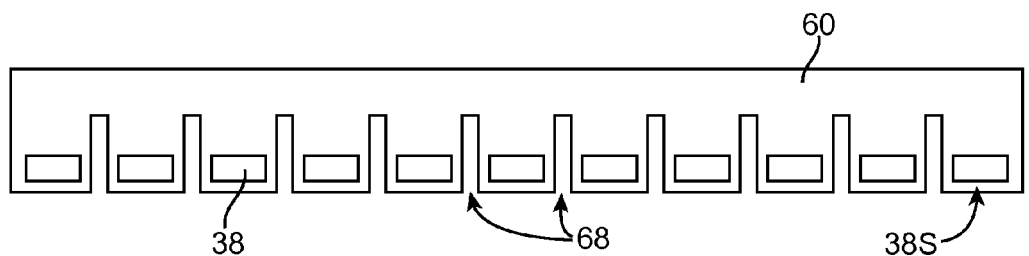
FIG. 9B is a top view of a flexible substrate that may be used to form the spring element of FIG. 9A in which the flexible substrate is provided with gaps that separate and mechanically decouple adjacent light-emitting diodes in accordance with an embodiment of the present invention.

If desired, light-emitting diodes 38 may be mechanically decoupled from one another so that each individual light-emitting diode 38 may independently register to light guide plate 32. A top view of flex tail 60 in which gaps are used to separate adjacent light-emitting diodes 38 is shown in FIG. 9B. If desired, flex tail 60 of FIG. 9B may be used to form the spring element of FIG. 9A.

As shown in FIG. 9B, a plurality of gaps 68 (e.g., rectangular slots) may be formed in flex tail 60, thereby creating a plurality of separated flexible tabs. Each light-emitting diode 38 may be mounted on an associated flexible tab. Gaps 68 may separate and mechanically decouple light-emitting diodes 38 from one another, allowing each to independently register to light guide plate 32.

In FIG. 9B, flex tail 60 is shown in a flat position (e.g., "uncurled"). When flex tail 60 is curled into the shape of spring element 60P shown in FIG. 9A, side surface 38S of light-emitting diode 38 may be in direct contact with light guide plate 32. The force provided by spring element 60P may push side surface 38S of each light-emitting diode 38 against light guide plate 32. Because light-emitting diodes 38 are mechanically decoupled from one another, misalignment in light-emitting diodes 38 will not affect the ability of individual light-emitting diodes 38 to physically contact the edge of light guide plate 32.

Figure 9C:
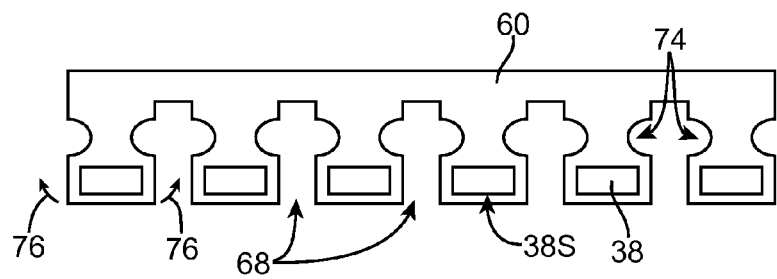
FIG. 9C is a top view of a flexible substrate that may be used to form the spring element of FIG. 9A in which the flexible substrate is provided with locally widened gaps in accordance with an embodiment of the present invention.

During manufacturing, a light-emitting diode may be unintentionally soldered to a flex tail at a slight angle. If care is not taken, this type of angled position may lead to an air gap between the light-emitting diode and the light guide plate. To ensure that light-emitting diodes 38 are flush with the edge of light guide plate 32, light-emitting diodes 38 may be provided with rotational capabilities. FIG. 9C is a top view of flex tail 60 in which light-emitting diodes 38 are provided with rotational capabilities. If desired, flex tail 60 of FIG. 9C may be used to form spring element 60P of FIG. 9A.

As shown in FIG. 9C, a plurality of slots 68 may be interposed between adjacent light-emitting diodes 38. Slots 68 may have locally widened portions such as widened portions 74. Having slots with locally widened portions may allow each light-emitting diode 38 to rotate slightly, as indicated by arrows 76 in FIG. 9C. Providing light-emitting diodes 38 with rotational capabilities may ensure that the entire side surface 38S of each light-emitting diode 38 is in direct contact with light guide plate 32.

Figure 10A:
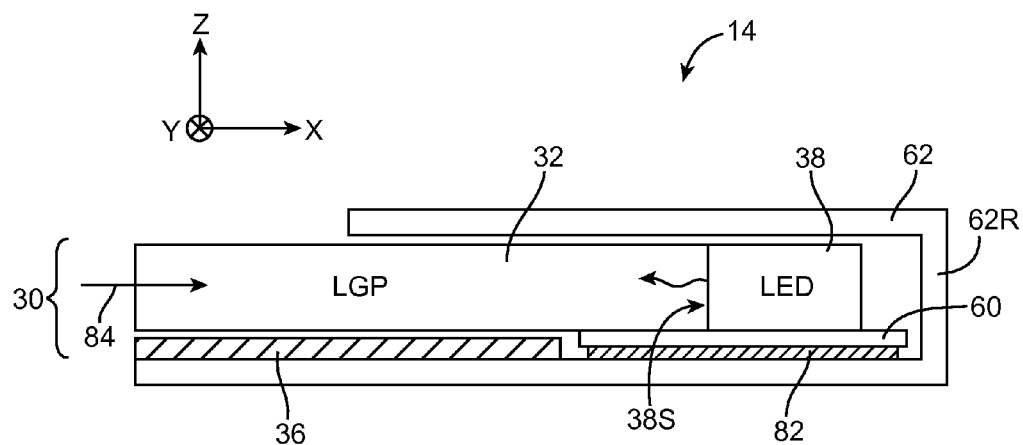
FIG. 10A is a cross-sectional side view of a backlight arrangement in which a high shear adhesive is used to attach the flexible substrate to a support structure in accordance with an embodiment of the present invention.

FIG. 10A is a cross-sectional side view of a portion of display 14 illustrating another possible backlight arrangement that may optimize the optical efficiency of display 14. As shown in FIG. 10A, flex tail 60 may lie flat along the edge of light guide plate 32.

A layer of adhesive such as adhesive 82 may be interposed between flex tail 60 and support structure 62. Adhesive 82 may be a high shear adhesive that attaches flex tail 60 to support structure 62 while allowing some movement of flex tail 60 along the surface of support structure 62. A high shear adhesive such as adhesive 82 may provide a means of securing flex tail 60 to the interior of support structure 62 without constricting its lateral movement on the surface of support structure 62 (e.g., without inhibiting registration between light guide plate 32 and light-emitting diodes 38). Adhesive 82 may be formed from pressure sensitive adhesive, UV-curable adhesive, air-curable adhesive, moisture-curable adhesive, or other suitable type of adhesive. If desired, adhesive 82 may be used as a heat sink. For example, adhesive 82 may be formed from a material with high thermal conductivity and may be configured to transfer heat from backlight structures 30 to support structure 62, housing 12, or other suitable heat spreader in the vicinity of backlight structures 30.

The plurality of light-emitting diodes 38 that are mounted on flex tail 60 may be mechanically decoupled from one another so that each individual light-emitting diode 38 may independently register to light guide plate 32. A top view of a flex tail of the type that may be used in the configuration of FIG. 10A is shown in FIG. 10B.

Figure 10B:
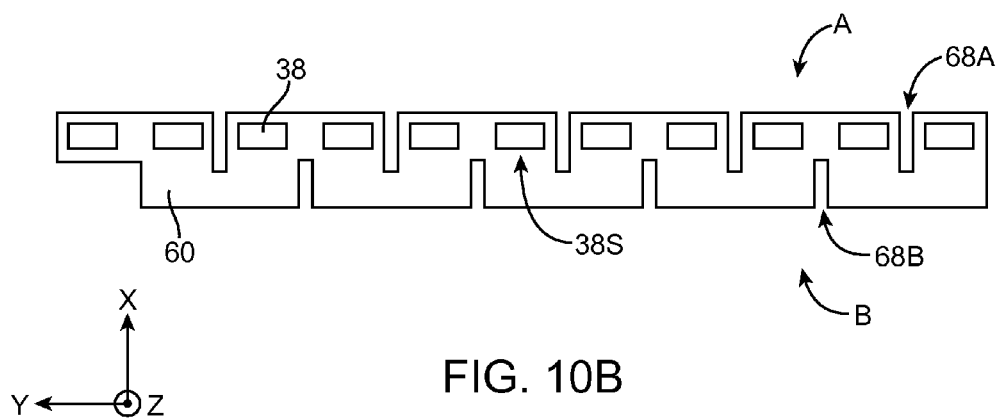
FIG. 10B is a top view of a flexible substrate that may be used in the arrangement of FIG. 10A in which the flexible substrate has a serpentine shape that mechanically decouples adjacent light-emitting diodes in accordance with an embodiment of the present invention.

As shown in FIG. 10B, flex tail 60 may have a serpentine shape in which gaps are formed on both sides of flex tail 60. For example, a gap such as gap 68A may be formed on side A of flex tail 60, between adjacent light-emitting diodes 38. The next closest gap such as gap 68B may be formed on side B of flex tail 60 (e.g., the opposite side of flex tail 60). The gaps may alternate sides along the length of flex tail 60 to create a serpentine-shaped flexible substrate.

When backlight structures 30 are inserted into support structure 62A, a force may be applied in direction 84 (FIG. 10A). This may push flex tail 60 into rear wall 62R of support structure 62 and reduce or eliminate gaps between light-emitting diodes 38 and light guide plate 32. Due to the serpentine-shape of flex tail 60 (FIG. 10B), light-emitting diodes 38 may be mechanically decoupled from one another so that side surface 38S of each light-emitting diode 38 may independently register to light guide plate 32.

Figure 11A:
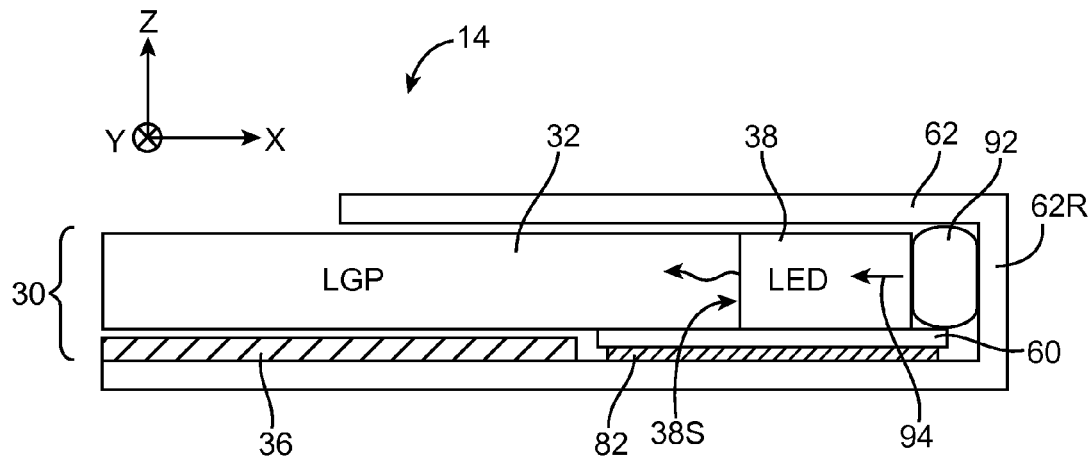
FIG. 11A is a cross-sectional side view of a backlight arrangement in which a biasing structure is used to press light-emitting diodes against a light guide plate in accordance with an embodiment of the present invention.

FIG. 11A is a cross-sectional side view of a portion of display 14 illustrating another possible backlight assembly that may be used to optimize the optical efficiency of display 14. As shown in FIG. 11A, flex tail 60 may lie flat along the edge of light guide plate 32. A biasing structure such as biasing structure 92 may be used to bias light-emitting diodes 38 against light guide plate 32 to help reduce or eliminate air gaps between light-emitting diodes 38 and light guide plate 32. Biasing structure 92 may be interposed between light-emitting diodes 38 and rear wall 62R of support structure 62.

If desired, biasing structure 92 may be formed from a conformable, thermally conductive foam (e.g., a foam formed from Gap Pad® material or other suitable material). Using a thermally conductive material to form biasing structure 92 may allow biasing structure 92 to transfer heat from backlight structures 30 (e.g., from light-emitting diodes 38) to support structure 62, housing 12, or other suitable heat spreader in the vicinity of backlight structures 30. Other structures that may be used to bias light-emitting diodes 38 against light guide plate 32 include metal-filled foam, a V-shaped structure (e.g., a V-shaped metal spring member), a spring structure, other suitable structures, etc.

Figure 11B:
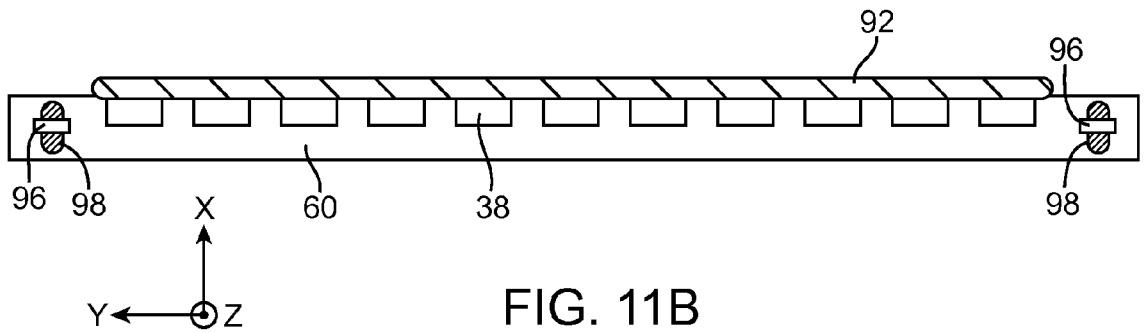
FIG. 11B is a top view of a flexible substrate that may be used in the arrangement of FIG. 11A in which the flexible substrate is provided with rail holes to attach the flexible substrate to a support structure in accordance with an embodiment of the present invention.

If desired, an optional adhesive such as high shear adhesive 82 may be used to attach flex tail 60 to support structure 62 without constricting its lateral movement on the surface of support structure 62 (e.g., without resisting the biasing force provided by biasing structure 92). This is, however, merely illustrative. Other methods may be used to attach flex circuit 60 to support structure 62. For example, opposing ends of flex tail 60 may be provided with rail holes. Screws or pins may be used to secure flex tail 60 to support structure 62 at the rail holes. FIG. 11B is a top view of flex tail 60 illustrating how rail holes may be used to attach flex tail 60 to support structure 62.

As shown in FIG. 11B, holes such as rail holes 98 (sometimes referred to as openings or slots) may be formed in opposing ends of flex tail 60. A pin such as pin 96 may be inserted through each rail hole 98. Pins 96 may be used to fasten flex tail 60 to support structure 62. Pins 96 may be mushroom pins, straight pins, or any other suitable type of pin or screw. Rail holes 98 may have an elongated "rail" shape. Movement of flex tail 60 in the y and z-directions may be restricted, whereas movement in the x-direction may be permitted (e.g., movement along the length of elongated rail holes 98 may be permitted). This type of fastening method may provide a means of securing flex tail 60 to the interior of support structure 62 without constricting its lateral movement relative to light guide plate 32 (e.g., without resisting the biasing force provided by biasing structure 92).

Figure 11C:
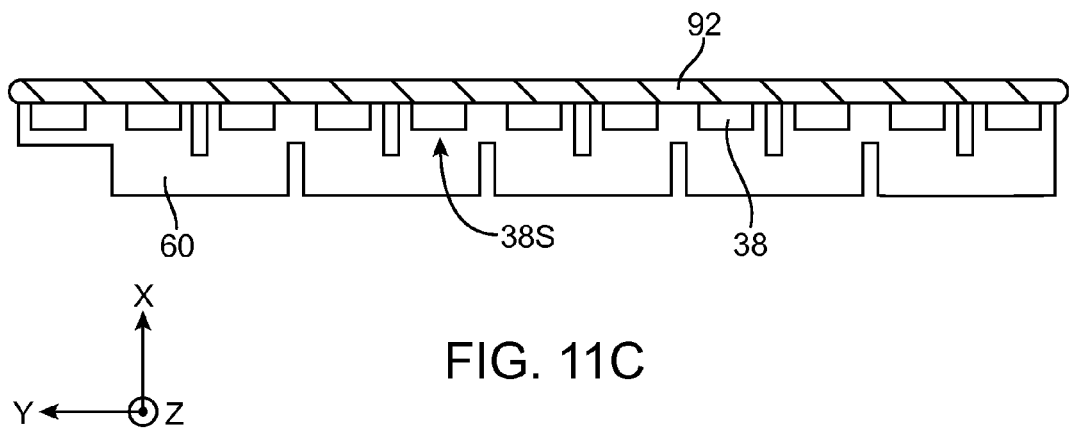
FIG. 11C is a top view of a flexible substrate that may be used in the arrangement of FIG. 11A in which the flexible substrate has a serpentine shape that mechanically decouples adjacent light-emitting diodes in accordance with an embodiment of the present invention.

When backlight structures 30 are inserted into support structure 62, biasing structure 92 may exert a force in direction 94 (e.g., biasing structure 92 may bias light-emitting diodes 38 against light guide plate 32). The biasing force provided by biasing structure 92 may reduce or eliminate gaps between light-emitting diodes 38 and light guide plate 32. If desired, flex tail 60 may be formed with a serpentine-shape as shown in FIG. 11C. The serpentine-shape of flex tail 60 may be used to mechanically decouple light-emitting diodes 38 from one another so that side surface 38S of each light-emitting diode 38 may independently register to light guide plate 32.

Figure 12A:
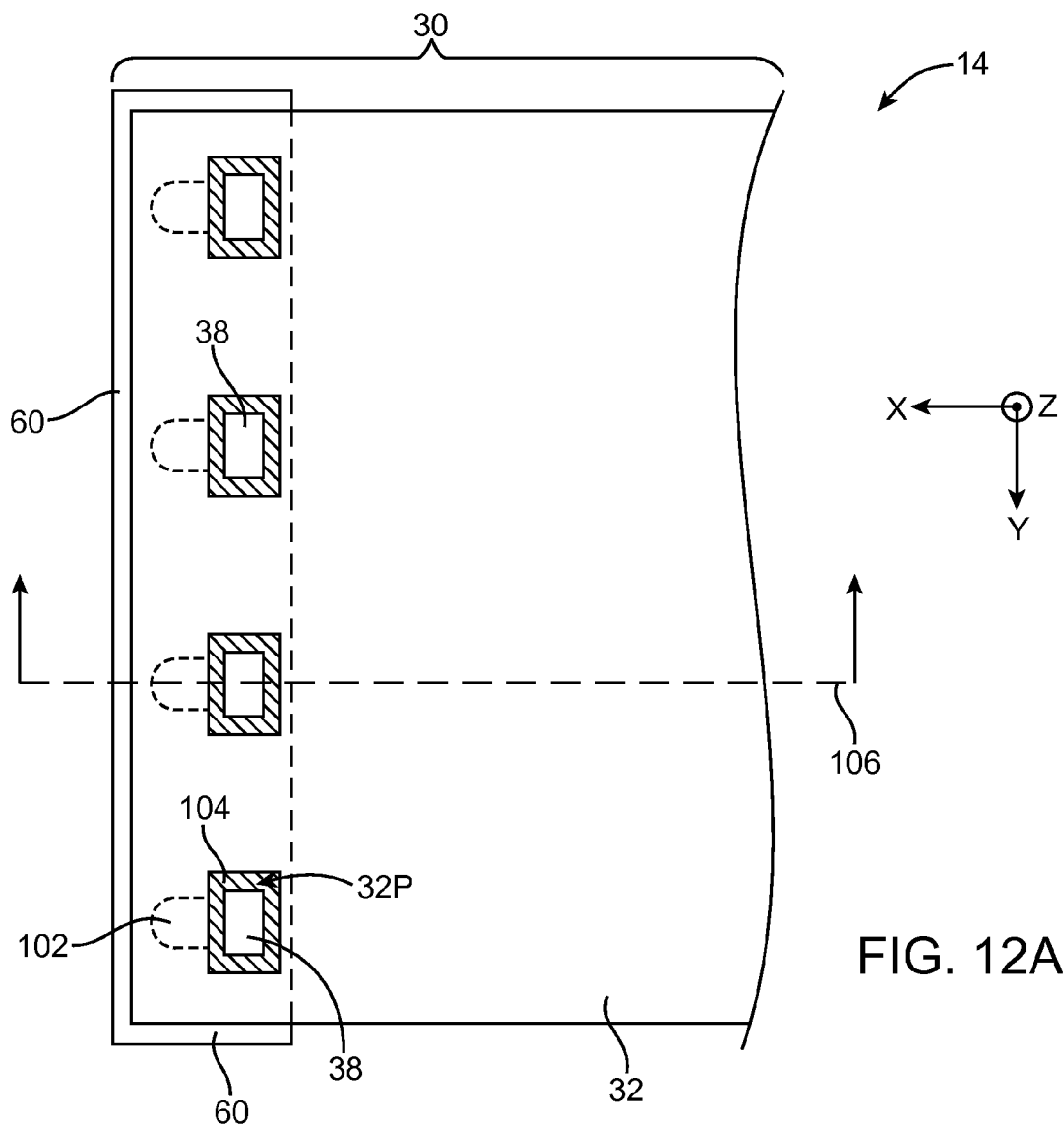
FIG. 12A is a top view of a backlight arrangement in which an index-matching material is used to fill gaps between light-emitting diodes and a light guide plate in accordance with an embodiment of the present invention.

FIG. 12A is a top view of a portion of display 14 illustrating another possible backlight assembly that may be used to optimize the optical efficiency of display 14. As shown in FIG. 12A, light guide plate 32 may have a row of holes 32P that extends parallel to one of the edges of light guide plate 32. Each hole 32P (sometimes referred to as an opening or light guide plate opening) may be enclosed and surrounded by light guide plate material.

Backlight structures 30 may include a row of light-emitting diodes 38 mounted on flex tail 60. An edge of light guide plate 32 may overlap flex tail 60 such that the row of light-emitting diodes 38 aligns with the row of light guide plate openings 32P. Light-emitting diodes 38 may each be positioned within an associated hole 32P. Holes 32P may have any suitable shape that accommodates light-emitting diodes 38 when light-emitting diodes 38 are inserted into light guide plate openings 32P. If desired, more than one light-emitting diode 38 may be mounted into an associated light guide plate opening 32P. The example of FIG. 12A in which a single light-emitting diode 38 is mounted in each opening 32P is merely illustrative.

To eliminate air gaps between light-emitting diodes 38 and light guide plate 32, an index-matching material such as index-of-refraction-matching material 104 may be used to fill holes 32P around each light-emitting diode 38. The refractive index of index-matching material 104 may be matched to the refractive index of light guide plate 32. In this type of configuration, the angle at which light from light-emitting diode 38 enters light guide plate 32 will not be effected by a change in refractive index as it passes from index-matching material 104 to light guide plate 32. Index-matching material 104 may be optically clear and may be formed from UV-curable adhesive, air-curable adhesive, moisture-curable adhesive, gel, or other suitable materials.

If desired, an optional reservoir such as reservoir 102 may be formed in light guide plate 32 adjacent to an associated opening 32P. Reservoir 102 may be formed as an extension to opening 32P (e.g., a recess or cavity adjacent to opening 32P). Reservoir 102 may be configured to receive excess index-matching material 104 in opening 32P. Reservoir 102 may be formed on a side of light-emitting diode 38 that does not emit light (e.g., a rear side of light-emitting diode 38 as shown in FIG. 12A). If desired, light guide plate openings 32P may not be provided with reservoirs 102. The example of FIG. 12A in which light guide plate openings 32P are provided with reservoirs 102 for receiving excess index-matching material 104 is merely illustrative.

Figure 12B:
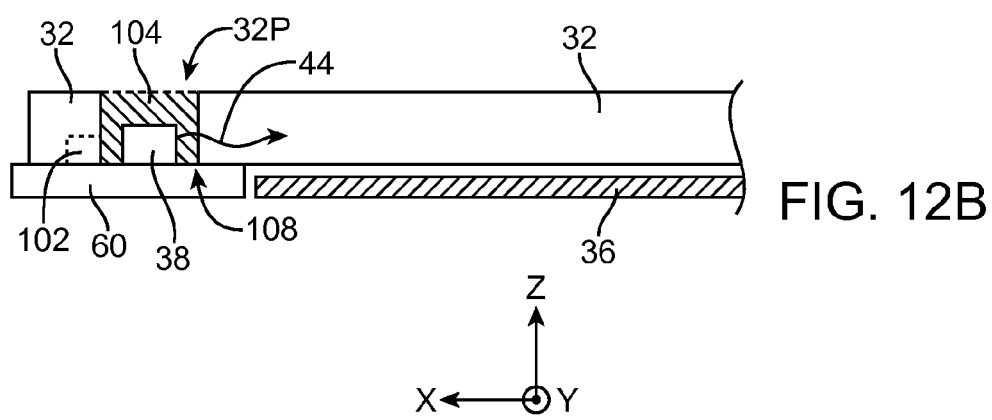
FIG. 12B is a cross-sectional side view of the backlight arrangement of FIG. 12A in which an index-matching material is used to fill gaps between light-emitting diodes and a light guide plate in accordance with an embodiment of the present invention.

A cross-section of backlight structures 30 taken along axis 106 is shown in FIG. 12B. As shown in FIG. 12B, light 44 may be emitted from light-emitting diode 38 and may travel through index-matching material 104 and into light guide plate 32. Index-matching material 104 may ensure that the angle at which light enters light guide plate 32 is not affected by a change refractive index at interface 108. Light 44 may travel within light guide plate 32 by means of total internal reflection. Light that escapes through the upper surface of light guide plate 32 may pass through overlying display layers in direction z and may serve as backlight for display 14. Light that escapes through the lower surface of light guide plate 32 may be reflected by reflector 36 and redirected upwards in direction z.

If desired, light may be launched into light guide plate 32 from more than one edge of plate 32. For example, a strip of light-emitting diodes 38 may be placed along one edge, two edges, three edges, or all four edges of light guide plate 32. The example of FIG. 12A in which light-emitting diodes 38 are located along one edge of light guide plate 32 is merely illustrative.

The foregoing is merely illustrative of the principles of this invention and various modifications can be made by those skilled in the art without departing from the scope and spirit of the invention. The foregoing embodiments may be implemented individually or in any combination.

What is claimed is:

1. A backlight assembly configured to provide backlight illumination for a display, comprising:
    a light guide plate having a surface from which the backlight illumination is provided to the display and having an edge into which light is launched to form the backlight illumination;
    a substrate; and
    a plurality of light-emitting diodes each having opposing first and second surfaces, wherein each of the light-emitting diodes is interposed between the edge and the substrate, wherein each of the light-emitting diodes launches a portion of the light from its first surface into the edge, wherein the second surface of each of the light-emitting diodes is mounted to the substrate, and wherein the substrate comprises a flexible sheet of polymer that is curled to form a spring that biases the first surfaces of the light-emitting diodes against the edge of the light guide plate.

2. The backlight assembly defined in claim 1 wherein the flexible sheet of polymer includes gaps and wherein each gap is interposed between two adjacent light-emitting diodes within the plurality of light-emitting diodes to mechanically decouple the two adjacent light-emitting diodes.

3. The backlight assembly defined in claim 1 further comprising a bend guiding structure around which the substrate is bent.

4. A backlight assembly configured to provide backlight illumination for a display, comprising:
    a light guide plate having a surface from which the backlight illumination is provided to the display and having an edge into which light is launched to form the backlight illumination;
    a flexible printed circuit; and
    a plurality of light-emitting diodes mounted on the flexible printed circuit and coupled to the edge of the light guide plate, wherein the flexible printed circuit is curled to form a spring and is configured to bias the plurality of light-emitting diodes against the edge of the light guide plate.

5. The backlight assembly defined in claim 4 wherein each of the light-emitting diodes has a base surface with which the light-emitting diode is mounted to the flexible printed circuit and wherein each of the light-emitting diodes has an edge surface that is perpendicular to the base surface and that emits light into the edge of the light guide plate.

6. The backlight assembly defined in claim 5 wherein the flexible printed circuit comprises a plurality of gaps, wherein each gap is interposed between two adjacent light-emitting diodes within the plurality of light-emitting diodes to mechanically decouple the two adjacent light-emitting diodes.

7. The backlight assembly defined in claim 4 wherein the flexible printed circuit comprises a plurality of gaps, wherein each gap is interposed between two adjacent light-emitting diodes within the plurality of light-emitting diodes to mechanically decouple the two adjacent light-emitting diodes.

8. The backlight assembly defined in claim 4 wherein the curled flexible printed circuit comprises a bent portion having portions forming perforations.

9. The backlight assembly defined in claim 4 wherein the curled flexible printed circuit comprises a bent portion having locally widened traces.

10. A backlight assembly configured to provide backlight illumination for a display, comprising:
  a light guide plate having a surface from which the backlight illumination is provided to the display and having an edge into which light is launched to form the backlight illumination;
  a flexible printed circuit; and
  a plurality of light-emitting diodes mounted on the flexible printed circuit and coupled to the edge of the light guide plate, wherein the flexible printed circuit has gaps, wherein each gap is interposed between two adjacent light-emitting diodes within the plurality of light-emitting diodes to mechanically decouple the two adjacent light-emitting diodes.

11. The backlight assembly defined in claim 10 wherein each gap has straight edges that form a rectangular slot.

12. The backlight assembly defined in claim 10 wherein each gap has edges that form a slot and wherein each slot has a locally widened portion.

13. The backlight assembly defined in claim 10 wherein the gaps are formed along an edge of the flexible printed circuit and wherein additional gaps are formed on an opposing edge of the flexible printed circuit so that the flexible printed circuit has a serpentine shape.

14. A backlight assembly configured to provide backlight illumination for a display, comprising:
  a light guide plate having a surface from which the backlight illumination is provided to the display and having an edge into which light is launched to form the backlight illumination;
  a flexible substrate;
  a plurality of light-emitting diodes mounted on the flexible substrate and coupled to the edge of the light guide plate; and
  a biasing structure that presses the light-emitting diodes against the edge of the light guide plate.

15. The backlight assembly defined in claim 14 wherein the biasing structure comprises foam.

16. The backlight assembly defined in claim 15 wherein the foam comprises thermally conductive foam that serves as a heat sink for the light-emitting diodes.

17. The backlight assembly defined in claim 14 further comprising:
  a support structure; and
  adhesive interposed between the support structure and the flexible substrate that attaches the flexible substrate to the support structure, wherein the adhesive is configured to allow sufficient lateral motion of the flexible substrate and the light-emitting diodes on the flexible substrate to laterally align each of the light-emitting diodes against the edge of the light guide plate.

18. The backlight assembly defined in claim 14 wherein the flexible substrate comprises rail holes to accommodate lateral movement of the flexible substrate and the light-emitting diodes relative to the light guide plate.

19. The backlight assembly defined in claim 14 wherein the flexible substrate has gaps and wherein each gap is interposed between two adjacent light-emitting diodes within the plurality of light-emitting diodes to mechanically decouple the two adjacent light-emitting diodes.

20. A backlight assembly, comprising:
  a light guide plate having a surface from which the backlight illumination is provided to the display and having a plurality of holes from which light is launched to form the backlight illumination, wherein each hole extends from an upper surface of the light guide plate to a lower surface of the light guide plate;
  a plurality of light-emitting diodes each of which is mounted in an associated one of the holes and is separated from an edge of the light guide plate by a respective gap; and
  an index-of-refraction-matching material that fills the gaps.

21. The backlight assembly defined in claim 20 wherein the light guide plate has reservoirs configured to receive excess portions of the index-of-refraction-matching material and wherein each of the reservoirs is formed as an extension to a respective one of the holes.

\* \* \* \* \*